United States Patent Office 3,353,907
Patented Nov. 21, 1967

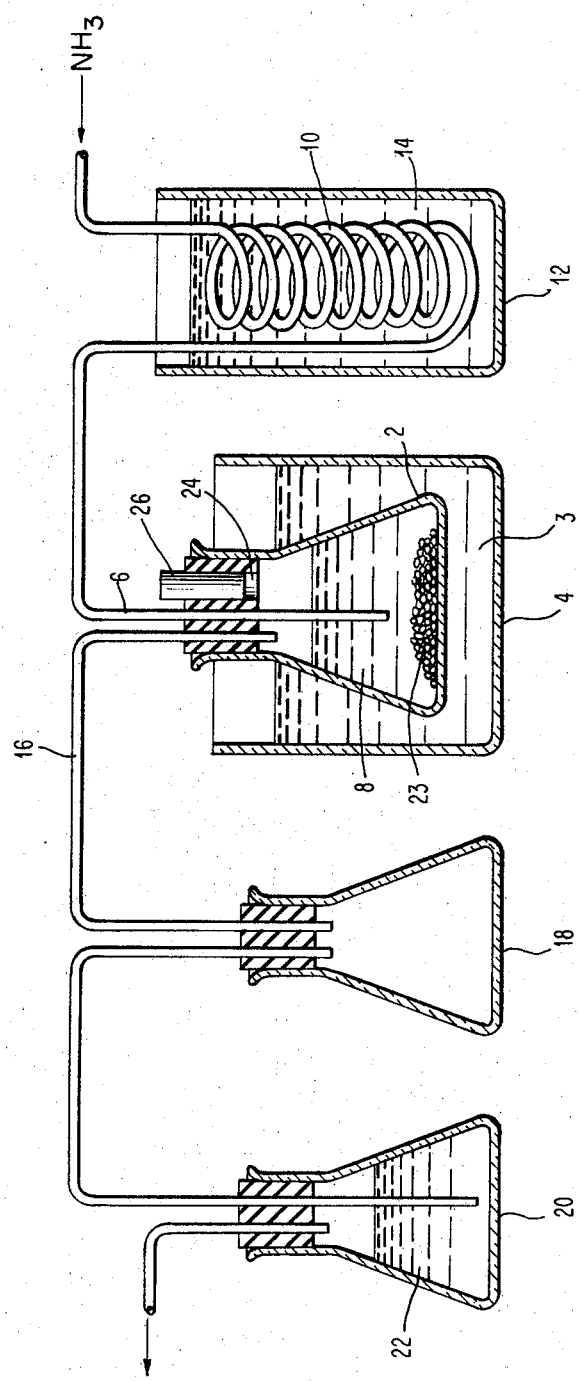

3,353,907
METHOD FOR PRODUCING RARE EARTH CHALCOGENIDES
Merrill W. Shafer, Yorktown Heights, N.Y., assignor to International Business Machines Corporation, New York, N.Y., a corporation of New York
Filed Oct. 2, 1964, Ser. No. 401,099
5 Claims. (Cl. 23—50)

ABSTRACT OF THE DISCLOSURE

Ferromagnetic europium II chalcogenide compounds are prepared by dissolving elemental europium and a chalcogen selected from sulfur and selenium in liquid ammonia. Heating the ammonia solution to a temperature at about the boiling point of liquid ammonia results in the precipitation of the product as finely divided crystals. The crystals are dried by heating them in a hydrogen atmosphere and cooled. The Eu II chalcogenides so prepared are useful as ferromagnetic core materials in low temperature transformers.

---

This invention relates to a method for producing rare earth chalcogenides and is particularly described with respect to the production of europium sulfide (EuS) and europium selenide (EuSe).

Both europium sulfide and europium selenide are useful as ferromagnetic core material in transformers, particularly when the transformers are to be used at liquid helium temperatures, as described in an article by Sabin Tansal and Harold Sobol, entitled Wide-Band Pulse Transformers for Matching Low Impedance Loads, Review of Scientific Instruments, vol. 34, No. 10, October 1963, pp. 1075–1081.

One of the major problems is preparing the ferromagnetic sulfides and selenides of europium by direct reaction of the elements is that they are highly reactive and often combine with explosive force. Also, such reactions involving relatively large particles of metal and a finely divided "non-metal" often result in inhomogeneous mixtures which can only be made uniform by time-consuming and expensive techniques. These problems are especially severe in the preparation of europium selenide. In the case of europium sulfide, the use of gaseous $H_2S$ eliminates the need to use the elemental reactions but, since it is necessary to perform the reaction at relatively high temperatures, oxygen is generally introduced into the europium sulfide lattice through the normally-used silica glass reaction tubes.

In the present invention, rare earth chalcogenides including, in particular, europium sulfide and europium selenide are precipitated from a liquid ammonia solution. Both metallic europium and the chalcogen (sulfur and selenium) are soluble in liquid ammonia and, when such solutions are mixed, an insoluble precipitate of the desired compounds (EuS or EuSe) is formed. The solubility of certain metals and the chalcogens in a liquid ammonia is described in an article by F. W. Bergstrom entitled The Polysulfides and Polyselenides of Lithium, Sodium and Potassium, Journal of the American Chemical Society, vol. 48, January 1926, pp. 146–151. This precipitate is separated from the solution by filtering or by evaporation of the ammonia solvent. The resulting precipitate of pure and finely divided europium sulfide or europium selenide is then dried and heated in hydrogen to increase the crystal size and provide immunity against contamination by atmospheric hydrogen and oxygen. Thus, the inventive method permits a rare earth (in particular europium) and the chalcogens to be brought into intimate contact without the danger of explosion to produce, at low temperatures, a rather dense ceramic of single phase europium sulfide or europium selenide.

It is thus a primary object of the present invention to provide a method of producing rare earth chalcogenides and, in particular europium sulfide and europium selenide.

Another object of the present invention is to provide a method of producing rare earth chalcogenides by admixing a liquid ammonia solution of a rare earth (such as europium) with a liquid ammonia solution of a chalcogen (such as sulfur and selenium).

A further object of the present invention is to provide a method of producing europium chalcogenides by admixing a liquid ammonia solution of europium with a liquid ammonia of a chalcogen (such as sulfur and selenium), forming a precipitate, and drying the precipitate.

The foregoing and other objects, features and advantages of the invention will be apparent from the following more particular description of a preferred embodiment of the invention as illustrated in the accompanying drawing:

The only drawing shows an apparatus that is suitable for use in performing the inventive techniques.

A reaction vessel 2 is located within a cooling chamber 4 that contains a coolant 3 sufficient to maintain the reaction vessel at a temperature lower than the boiling point of ammonia ($-33°$ C.). Dry Ice floating in acetone, cooled nitrogen, or any other suitable coolant can be used.

A flow of gaseous ammonia ($NH_3$) is then supplied through a tube 6 to the reaction vessel 2, wherein it is liquefied. The ammonia is precooled by application through a cold trap consisting of a coiled tube 10 immersed in a vessel 12 of brine or ice water 14. Ammonia leaves the vessel 2 through a tube 16 and is passed through traps 18 and 20. Trap 20 contains oil 22 to insure that accidental back-pressures cannot introduce atmospheric impurities into the reaction vessel, and trap 18 insures that oil cannot enter the reaction vessel should accidental back-pressures exist.

With liquid ammonia in the reaction chamber 2, particles 23 of europium and either sulfur or selenium are placed in the vessel through an opening 24 which is then closed with a plug 26. The amount of europium and selenium or sulfur that is introduced is proportional to their atomic weights. That is, since the atomic weight of europium, sulfur and selenium are 152.0, 32.07, and 78.96, respectively, weights proportional to these are used, such as 15.2 gms. of europium and either 3.207 gms. of sulfur or 7.896 gms. of selenium.

The system is permitted to stand until the europium and chalcogen are dissolved in the ammonia (for about 5 minutes). A precipitate is then formed and is recovered by filtering or evaporating the ammonia solution. The reaction vessel is then heated in the absence of oxygen or moisture vapor at a temperature between 100° C. and 2400° C. for europium sulfide and between 100° C. and 1800° C. for europium selenide to dry the precipitate, resulting in the production of crystals of increased size that are stable against contamination by atmospheric hydrogen and oxygen.

The following description provides detailed data on experiments that were successfully carried out.

Europium sulfide was produced in an apparatus as shown in the drawing. Dry Ice floating in acetone was used as the coolant 3 and cold brine was used as the coolant 14. Correct proportions (as stated above) of europium and sulfur were allowed to remain in vessel 2 for about 5 minutes (until the solution is clear). The precipitate was formed by allowing the ammonia to boil (about $-33°$ C.). The precipitate was then heated to a temperature of about 600° C. in an atmosphere of flowing hydrogen for about 6 hours.

Europium selenide was also produced in an apparatus as shown in the drawing in the same manner that europium sulfide was produced, except that the appropriate amount of selenium was used in place of the sulfur.

Thus, the present invention provides a method of producing high purity rare earth chalcogenides and, in particular, europium sulfide and europium selenide, in a controlled manner without the danger of explosion.

While the invention has been particularly shown and described with reference to a preferred embodiment thereof, it will be understood by those skilled in the art that various changes in form and details may be made therein without departing from the spirit and scope of the invention.

What is claimed is:

1. A method of preparing europium (II) chalcogenide compounds comprising the steps of:
    (a) dissolving elemental europium and a chalcogen selected from the group consisting of sulfur and selenium in liquid ammonia,
    (b) heating the liquid ammonia solution to a temperature of about the boiling point of said liquid ammonia to precipitate said europium (II) chalcogenide compound, and
    (c) drying the precipitate by heating said precipitate in an oxygen and moisture free atmosphere and cooling said dried precipitate.
2. The method of claim 1 wherein the chalcogen is sulfur.
3. The method of claim 1 wherein the chalcogen is selenium.
4. The method of claim 2 wherein the precipitate is dried by heating said precipitate in a pure hydrogen atmosphere at a temperature of from 100° C. to 2400° C.
5. The method of claim 3 wherein the precipitate is dried by heating said precipitate in a pure hydrogen atmosphere at a temperature of from about 100° C. to 1800° C.

References Cited

Jolly: Article in "Progress in Inorganic Chemistry," vol. 1, ed. by F. A. Cotton, Interscience Pub., Inc., New York, 1959, pp. 235–238.

Topp: "The Chemistry of the Rare-Earth Elements," Elservier Pub. Co., New York, 1965, pp. 98–110.

OSCAR R. VERTIZ, *Primary Examiner.*

H. T. CARTER, *Assistant Examiner.*